United States Patent
Wu et al.

(10) Patent No.: US 8,786,270 B2
(45) Date of Patent: Jul. 22, 2014

(54) SYNTHETIC RIPPLE REGULATOR WITH FREQUENCY CONTROL

(75) Inventors: Xuelin Wu, Plano, TX (US); Xiping Yang, Plano, TX (US); Sisan Shen, Plano, TX (US); Jian-Song Chen, Plano, TX (US)

(73) Assignee: Intersil Americas Inc., Milpitas, CA (US)

( * ) Notice: Subject to any disclaimer, the term of this patent is extended or adjusted under 35 U.S.C. 154(b) by 167 days.

(21) Appl. No.: 13/217,150

(22) Filed: Aug. 24, 2011

(65) Prior Publication Data
US 2012/0112721 A1    May 10, 2012

Related U.S. Application Data

(60) Provisional application No. 61/411,036, filed on Nov. 8, 2010.

(51) Int. Cl.
*G05F 1/00* (2006.01)
*H02M 3/156* (2006.01)

(52) U.S. Cl.
CPC ..................................... *H02M 3/156* (2013.01)
USPC .......................................... 323/288; 323/282

(58) Field of Classification Search
USPC ......................................... 323/282–285, 288
See application file for complete search history.

(56) References Cited

U.S. PATENT DOCUMENTS

| | | | |
|---|---|---|---|
| 4,413,224 A | 11/1983 | Krupka et al. | |
| 4,521,726 A | 6/1985 | Budnik | |
| 4,658,204 A | 4/1987 | Goodwin | |
| 4,801,859 A | 1/1989 | Dishner | |
| 4,929,882 A | 5/1990 | Szepesi | |
| 5,382,893 A | 1/1995 | Dehnel | |
| 5,399,958 A | 3/1995 | Iyoda | |
| 5,514,947 A | 5/1996 | Berg | |

(Continued)

FOREIGN PATENT DOCUMENTS

| | | |
|---|---|---|
| DE | 3343883 A1 | 6/1984 |
| DE | 4206478 A1 | 9/1993 |

(Continued)

OTHER PUBLICATIONS

Hara, N. et al. "Realization and Analysis of a New Switched-Capacitor Coilless Powersupply for One-Chip IC Implementation." Systems & Computers in Japan, Wiley, Hoboken, NJ, US. vol. 29, No. 12 Nov. 15, 1998 pp. 19-33 XP000821933.

*Primary Examiner* — Jue Zhang
*Assistant Examiner* — Henry Lee, III
(74) *Attorney, Agent, or Firm* — Gary Stanford

(57) ABSTRACT

A synthetic ripple regulator including frequency control based on a reference clock. The regulator includes an error network, a ripple detector, a combiner, a ripple generator, a comparator network and a phase comparator. The error network provides an error signal indicative of relative error of the output voltage. The ripple detector provides a ramp control signal based on the input and output voltages and a pulse control signal. The combiner adjusts the ramp control signal based on a frequency compensation signal to provide an adjusted ramp control signal. The ripple generator develops a ripple control signal based on the adjusted ramp control signal. The comparator network develops the pulse control signal to control switching based on the error signal and the ripple control signal. The phase comparator compares the pulse control signal with the reference clock and provides the frequency compensation signal.

20 Claims, 7 Drawing Sheets

(56) References Cited

U.S. PATENT DOCUMENTS

| | | |
|---|---|---|
| 5,705,919 A | 1/1998 | Wilcox |
| 5,731,694 A | 3/1998 | Wilcox et al. |
| 5,747,977 A | 5/1998 | Hwang |
| 5,760,495 A | 6/1998 | Mekanik |
| 5,770,940 A | 6/1998 | Goder |
| 5,898,234 A | 4/1999 | Kitagawa |
| 5,949,220 A | 9/1999 | Ide et al. |
| 5,959,853 A | 9/1999 | Kos |
| 6,064,187 A | 5/2000 | Redl et al. |
| 6,147,478 A | 11/2000 | Skelton et al. |
| 6,147,526 A | 11/2000 | Skelton et al. |
| 6,166,527 A | 12/2000 | Dwelley et al. |
| 6,246,222 B1 | 6/2001 | Nilles et al. |
| 6,271,650 B1 | 8/2001 | Massie et al. |
| 6,307,360 B1 | 10/2001 | Kajiwara et al. |
| 6,362,607 B1 | 3/2002 | Wickersham et al. |
| 6,433,525 B2 | 8/2002 | Muratov et al. |
| 6,456,050 B1 | 9/2002 | Agiman |
| 6,495,995 B2 | 12/2002 | Groom et al. |
| 6,583,610 B2 * | 6/2003 | Groom et al. ............ 323/288 |
| 6,791,306 B2 | 9/2004 | Walters et al. |
| 6,819,577 B1 | 11/2004 | Wiktor et al. |
| 6,825,644 B2 | 11/2004 | Kernahan et al. |
| 6,828,766 B2 | 12/2004 | Corva et al. |
| 6,841,983 B2 | 1/2005 | Thomas |
| 6,894,471 B2 | 5/2005 | Corva et al. |
| 6,922,044 B2 | 7/2005 | Walters et al. |
| 7,019,502 B2 | 3/2006 | Walters et al. |
| 7,019,504 B2 | 3/2006 | Pullen et al. |
| 7,106,036 B1 | 9/2006 | Collins |
| 7,116,568 B1 | 10/2006 | Birchenough |
| 7,132,820 B2 | 11/2006 | Walters et al. |
| 7,145,317 B1 | 12/2006 | Shah |
| 7,193,396 B2 | 3/2007 | Orr |
| 7,391,190 B1 | 6/2008 | Rajagopalan |
| 7,394,231 B2 | 7/2008 | Flatness et al. |
| 7,432,689 B2 | 10/2008 | Miller et al. |
| 7,495,419 B1 | 2/2009 | Ju |
| 7,570,033 B1 | 8/2009 | Ju |
| 7,598,715 B1 | 10/2009 | Hariman et al. |
| 7,696,735 B2 | 4/2010 | Oraw et al. |
| 7,737,668 B2 | 6/2010 | Oswald et al. |
| 7,768,246 B2 | 8/2010 | Huang et al. |
| 7,786,712 B2 | 8/2010 | Williams |
| 7,834,608 B2 | 11/2010 | Cheng et al. |
| 7,932,709 B1 | 4/2011 | Ling |
| 2001/0035745 A1 | 11/2001 | Muratov et al. |
| 2003/0057922 A1 | 3/2003 | Odaohhara et al. |
| 2003/0142519 A1 | 7/2003 | Walters et al. |
| 2004/0070382 A1 * | 4/2004 | Walters et al. ............ 323/284 |
| 2004/0075418 A1 | 4/2004 | Densham et al. |
| 2004/0090804 A1 | 5/2004 | Lipcsei et al. |
| 2004/0196095 A1 | 10/2004 | Nonaka |
| 2005/0017703 A1 | 1/2005 | Walters et al. |
| 2005/0212489 A1 | 9/2005 | Denning et al. |
| 2006/0043943 A1 * | 3/2006 | Huang et al. ............ 323/222 |
| 2007/0296383 A1 | 12/2007 | Xu et al. |
| 2008/0157723 A1 | 7/2008 | Xing et al. |
| 2009/0009148 A1 * | 1/2009 | Philbrick ............ 323/282 |
| 2009/0033289 A1 | 2/2009 | Xing et al. |
| 2009/0033293 A1 | 2/2009 | Xing et al. |
| 2009/0102440 A1 | 4/2009 | Coles |
| 2009/0140711 A1 | 6/2009 | Philbrick et al. |
| 2010/0026263 A1 | 2/2010 | Moussaoui et al. |
| 2010/0123446 A1 | 5/2010 | Cheng et al. |

FOREIGN PATENT DOCUMENTS

| | | |
|---|---|---|
| EP | 0650250 A1 | 4/1995 |
| EP | 0883051 A1 | 12/1998 |
| EP | 1073187 A2 | 1/2001 |
| FR | 2610149 A1 | 7/1998 |
| WO | WO03065558 | 8/2003 |

* cited by examiner

US 8,786,270 B2

SYNTHETIC RIPPLE REGULATOR WITH FREQUENCY CONTROL

CROSS-REFERENCE TO RELATED APPLICATIONS

This application claims the benefit of U.S. Provisional Application Ser. No. 61/411,036, filed on Nov. 8, 2010, which is hereby incorporated by reference in its entirety for all intents and purposes.

BRIEF DESCRIPTION OF THE DRAWINGS

The benefits, features, and advantages of the present invention will become better understood with regard to the following description, and accompanying drawings in which.

DETAILED DESCRIPTION

Figure 1:
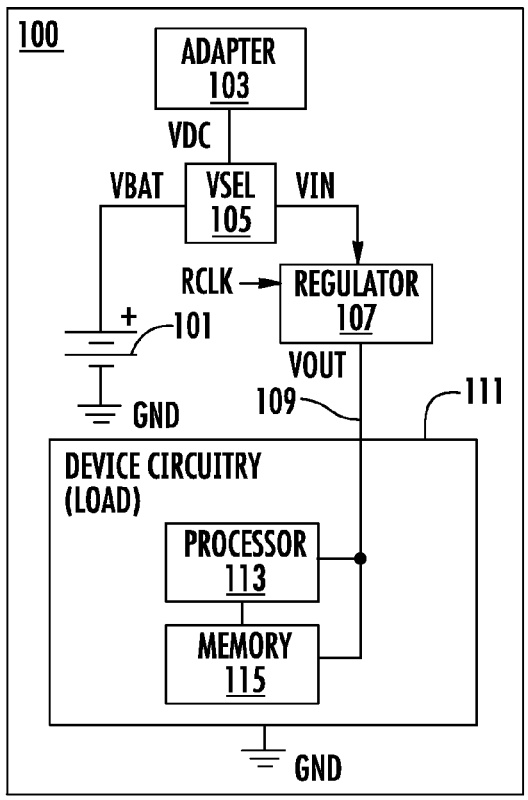
FIG. 1 is a block diagram of an electronic device including a DC-DC switching voltage regulator (otherwise referred to as a converter or power supply or the like) implemented with frequency control according to an exemplary embodiment of the present invention.

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

A DC/DC switched regulator employing synthetic ripple modulation achieves superior performance in response to load transients. Synthetic ripple modulation is described and illustrated in various publications, including U.S. Pat. No. 6,791,306, U.S. Pat. No. 7,132,820, U.S. Pat. No. 7,145,317, U.S. Publication No. 2009/0140711, in which each is incorporated herein by reference. In general, an auxiliary voltage waveform is developed which effectively replicates the waveform ripple current through an output inductor. The auxiliary voltage waveform is used to control toggling of a comparator, such as a hysteretic comparator or the like. In a non-limiting implementation, for example, a transconductance amplifier monitors the voltage across the output inductor, and supplies an inductor voltage-representative current to a ripple waveform capacitor, in which the capacitor voltage is the auxiliary voltage waveform. The artificial or synthesized ripple waveform controls the switching operation of the regulator, reducing output ripple, simplifying compensation, and improving DC accuracy.

The operating frequency of a synthetic ripple regulator changes in response to load transients to achieve desired performance. The steady-state operating frequency of the synthetic ripple regulator, however, has been more difficult to control. It is desired to have a fixed or known steady-state operating frequency to maximize performance and minimize noise, such as electromagnetic interference (EMI) and the like. The challenge is that when there are changes of any one or more of the input voltage VIN, output current (e.g., load current), the output voltage VOUT, or the equivalent series resistance (ESR) of the output capacitor, among other factors, the slope of the synthetic ramp also changes, so that the switching frequency changes given a fixed hysteretic window size. Dedicated circuitries are implemented to fix the frequency cross temperature, input/output voltage and output filters. The present disclosure describes a new architecture to have the converter (regulator) run at fixed frequency or synchronized to an external clock. A phase lock loop (PLL) is inserted into the regulator to control the slope of the synthetic modulation ramp in order to control frequency. Thus, by integrating a phase lock loop into the synthetic ripple regulator, the regulator runs under a fixed frequency or is synchronized to an external clock, while maintaining its superior quality of load transient response. This makes the synthetic ripple regulator fit for general purpose applications.

FIG. 1 is a block diagram of an electronic device 100 including a DC-DC switching voltage regulator 107 (otherwise referred to as a converter or power supply or the like) implemented with frequency control according to an exemplary embodiment of the present invention. The electronic device 100 is shown including a battery 101 providing a battery voltage VBAT to one input of a voltage select (VSEL) circuit 105, having another input receiving a DC voltage (VDC) from an adapter 103. The adapter 103 receives AC or DC voltage from an external power source, such as an alternating current (AC) source (not shown), and converts the received voltage to the VDC voltage. If the battery 101 is rechargeable, then the adapter 103 may include a battery charger for charging the battery 101 or a separate battery charger (not shown) may be included. The VSEL circuit 105 provides an input voltage VIN to an input of the voltage regulator 107. The voltage regulator 107 has an input receiving a reference clock signal RCLK and has an output providing an output voltage VOUT on a power bus 109 or the like to provide source voltage to a load, shown as device circuitry 111. The device circuitry 111 generally includes the circuitry of the electronic device 100. As shown, the device circuitry 111 may include a processor 113 coupled to a memory 115, both coupled to the power bus 109 for receiving supply voltage from the regulator 107 (e.g., VOUT). Other types of electronic devices that do not have a processor or memory are also contemplated.

The electronic device 100 may be any type of electronic device, including mobile, portable, or handheld devices, such as, for example, any type of personal digital assistant (PDA), personal computer (PC), portable computer, laptop computer, etc., cellular phone, personal media device, etc. In an alternative embodiment, the electronic device 100 is not battery-powered and is powered by an AC source or other source of power. In general, the voltage regulator 107 is configured as a power regulator for computer, industrial, consumer, etc., applications and/or battery-powered applications.

The primary functions of the electronic device 100 are performed by the device circuitry 111 in the illustrated configuration. In one embodiment the battery 101 is a rechargeable battery of any suitable type (including and automotive batteries), although non-rechargeable batteries are contemplated. In various embodiments the voltage of VIN is below VOUT for a boost configuration, VIN is above VOUT for a buck configuration, or VIN relative to VOUT may range anywhere between for various other configurations, such as, for example, a single-ended, primary-inductor converter (SEPIC) or buck-boost converts or the like. The regulator 107 is illustrated herein as a buck-type synthetic ripple regulator, although other types of regulators are contemplated.

Figure 2:
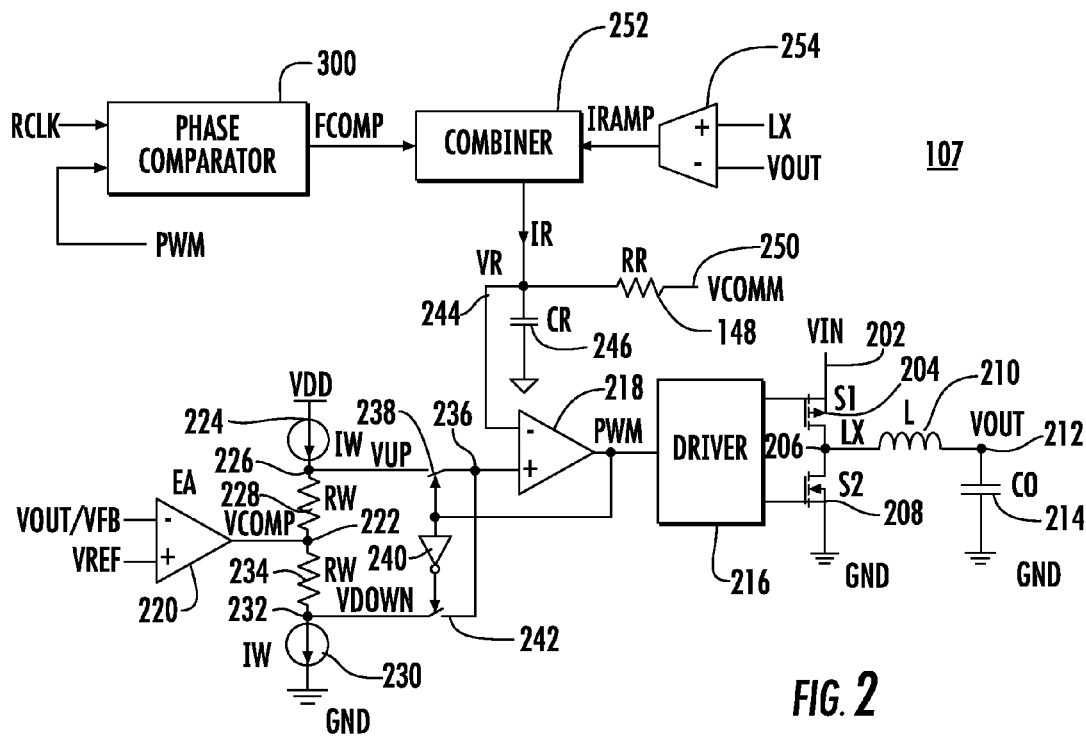
FIG. 2 is a schematic and block diagram of the synthetic ripple regulator of FIG. 1 with frequency control according to one embodiment.

FIG. 2 is a schematic and block diagram of the synthetic ripple regulator 107 with frequency control according to one embodiment. The input voltage VIN is provided to an input node 202. A first electronic switch S1 has current terminals coupled between node 202 and a phase node 206 developing a phase signal LX. A second electronic switch S2 108 has current terminals coupled between the phase node 206 and a reference node, such as ground. An output inductor 210 is coupled between the phase node 206 and an output voltage node 212 for providing the output voltage VOUT. An output capacitor 214 is coupled between the output node 212 and ground. Each of the electronic switches 204 and 208 are driven responsive to control signals provided to corresponding control terminals of the switching transistors 204 and 208 from a driver block 216. In one embodiment, electronic switches Q1 and Q2 are shown as a pair of metal oxide semiconductor field effect transistors (MOSFETs) as known to those skilled in the art. Switch S1 is shown as a P-channel transistor having its source coupled to input node 202 and its drain coupled to phase node 206, and switch S2 is an N-channel transistor having its source coupled to ground and its drain coupled to the phase node 206. The gates of switches S1 and S2 receive gate drive control signals from the driver block 216. Other types of electronic switching devices may be used including other types of FETs and the like, or other types of transistors, such as bipolar junction transistors (BJTs) or insulated-gate bipolar transistors (IGBTs) and the like, etc.

The driver block 216 receives a pulse width modulation (PWM) control signal from a PWM comparator 218. The non-inverting input of the PWM comparator 218 is coupled to a node 236 and its inverting input is coupled to a ripple node 244. Node 236 receives a selected control signal provided by an error amplifier 220 and a window network. The error amplifier 220 has its inverting input coupled to receive VOUT from the output node 212 or to receive a feedback voltage VFB which is a sensed version of VOUT. For example, although not shown, VOUT may be provided to an output voltage sense network, such as a resistive voltage divider or the like, which develops VFB as a proportional voltage indicative of VOUT. The non-inverting input of the error amplifier 220 receives a reference voltage VREF having a voltage level indicative of a desired level of whichever one of VOUT or VFB is provided to the error amplifier 220. The output of the error amplifier 220 provides a compensation signal VCOMP, which is provided to a center node 222 of the window network.

The window network includes window resistors 228 and 234, window current sources 224 and 230, controlled single-pole, single-throw (SPST) switches 238 and 242 and inverter 240. The current source 224 is coupled to provide a window current IW from a source voltage VDD to a first window node 226 developing an upper window voltage VUP. The first window resistor 228 is coupled between nodes 226 and 222 and the second window resistor 234 is coupled between node 222 and a node 232 developing a lower window voltage VDOWN. The current source 230 is coupled to sink the window current IW from node 232 to ground. The window resistors 228 and 234 both have a window resistance of approximately RW, forming a balanced configuration between VUP and VDOWN and the center node 222 receiving VCOMP. In particular, the current IW flowing into each resistance RW develops a window voltage VW, so that VUP=VCOMP+VW and VDOWN=VCOMP−VW.

Switch 238 is coupled between VUP and node 236 (at the non-inverting input of the comparator 218) and switch 242 is coupled between VDOWN and node 236. The PWM signal at the output of the comparator 218 is provided to a control input of the switch 238 and to the input of the inverter 240. The output of the inverter 240 is coupled to the control input of the switch 242. In this manner, when PWM is asserted high, the switch 238 is closed while the switch 242 is opened so that VUP is provided to node 236 and thus to the non-inverting input of the comparator 218. Similarly, when PWM is asserted low, the switch 238 is opened while the switch 242 is closed so that VDOWN is instead provided to node 236 and thus to the non-inverting input of the comparator 218.

The ripple node 244, which is coupled to the inverting input of the comparator 218, is a ripple node developing a ripple voltage VR. A ripple capacitor 246 having a ripple capacitance CR is coupled between the ripple node 244 and ground. A ripple resistor 248 having a resistance RR is coupled between ripple node 244 and common voltage node 250 receiving a common voltage VCOMM. The ripple node 244 receives an adjusted ramp current IR from a combiner network 252, which combines a ramp current IRAMP and a frequency compensation voltage FCOMP to develop the ramp current IR. As further described herein, the ramp current IR charges and discharges the ripple capacitor 246 (alternating between positive and negative current levels, as further described herein) to develop the ripple voltage VR, which has a sawtooth waveform. The common voltage VCOMM is set at a target level for the midpoint of the synthetic ripple voltage during steady state operation.

The phase node 106 develops the phase voltage LX which is provided to the non-inverting input of a transconductance network 254, which receives VOUT at its non-inverting input. The transconductance network 254 develops IRAMP at its output, which has a current level proportional to the difference between LX and VOUT. The gain GMR of the transconductance network 254 determines the proportionality between the difference between LX and VOUT and IRAMP. In a conventional synthetic ramp regulator, IRAMP is provided as the ramp current to the ripple node 244 to charge/discharge the ripple capacitor 246. For the regulator 107, IRAMP is instead adjusted by FCOMP by the combiner network 252 to achieve frequency control as further described herein.

In operation, the error amplifier 220 develops VCOMP at a level indicative of the error level of VOUT. The window network develops VUP and VDOWN to follow VCOMP each separated by the window voltage VW as previously described. Assuming PWM is high, the switch 238 couples VUP to the comparator 118 and the driver turns on the upper switch S1 204 and turns off the lower switch S2 208. The phase node 206 is coupled to the input node 202 driving LX to the voltage level of VIN. In a buck converter, VIN is greater than VOUT inducing current to flow through the output inductor 210 to charge the output capacitor 214 tending to increase the voltage level of VOUT. The transconductance network 254 generates IRAMP as a positive current proportional to the difference between VIN and VOUT since LX is driven up to VIN. Ignoring FCOMP and the combiner network 252, the ramp current IR charges the ripple capacitor 246 so that the ripple voltage VR ramps up towards VUP.

When VR reaches or otherwise exceeds VUP, the comparator 218 switches and pulls PWM low. The switch 238 is opened and the switch 242 is closed so that VDOWN is coupled to the comparator 218 in accordance with hysteretic functionality. Also, the driver block 216 turns switch S1 off and turns switch S2 on so that the phase node 206 is effectively coupled to ground pulling LX low to ground. This tends to slow and/or reverse current flow through the output inductor 210 tending to decrease the voltage level of VOUT. The transconductance network 254 generates IRAMP as a negative current proportional to the difference between VIN and VOUT since LX is driven low, so that the ramp current IR discharges the ripple capacitor 246. Thus, the ripple voltage VR ramps down towards VDOWN. When VR reaches or otherwise falls below VDOWN, the comparator 218 switches and pulls PWM back high. The switch 238 is closed and the switch 242 is opened so that VUP is once again coupled to the comparator 118 in accordance with hysteretic functionality. Also, the driver block 216 turns switch S2 off and turns switch S1 back on so that the phase node 206 is effectively pulled back up to VIN. Operation repeats in this manner for consecutive cycles of PWM.

The voltage across the output inductor 210 LX−VOUT is applied at the input of the transconductance network 254. As LX toggles between VIN and ground, a ripple current develops through the output inductor 210. The transconductance network 254 develops IRAMP which is provided as the ramp current (ignoring the combiner network 252) to charge and discharge the ripple capacitor 246 to develop the ripple voltage VR. Thus, VR is the auxiliary voltage waveform which effectively replicates the waveform ripple current through the output inductor 210, which is used to control the toggling of the comparator 218. The window network provides the hysteretic function centered at the compensation voltage VCOMP.

In response to load increase transient, VOUT tends to decrease causing VCOMP to increase, which temporarily increases the switching frequency to quickly respond to the load increase transient to maintain regulation. Similarly, in response to load decrease transient, VOUT tends to increase causing VCOMP to decrease, which temporarily decrease the switching frequency to quickly respond to the load decrease transient to maintain regulation. As previously stated, the steady-state operating frequency of a synthetic ripple regulator, including the regulator 107, has been more difficult to control. It is desired to have a fixed or known steady-state operating frequency to maximize performance and minimize noise, such as EMI and the like. Variations in VIN, VOUT, steady-state load (e.g., output current) or the ESR of the output capacitor 214 change the slope of the synthetic ramp voltage VR within a fixed hysteretic window size, which may change the steady-state switching frequency.

A phase comparator 300 compares the reference clock RCLK with PWM and develops the frequency compensation signal FCOMP provided to the comparator 252. RCLK may be externally provided or generated by a clock generator or the like (not shown). A designer may select the frequency of RCLK based on the voltage level or voltage ranges of VIN and VOUT, the ESR of the output capacitor, and other circuit variables. The combiner network 252 combines FCOMP with IRAMP to provide the adjusted ramp current IR as a function of IRAMP and FCOMP. FCOMP may be internally or externally provided. As described herein, the slope of the synthetic ripple voltage VR is controlled by adjusting IR to maintain the steady state switching frequency at the desired level.

Figure 3:
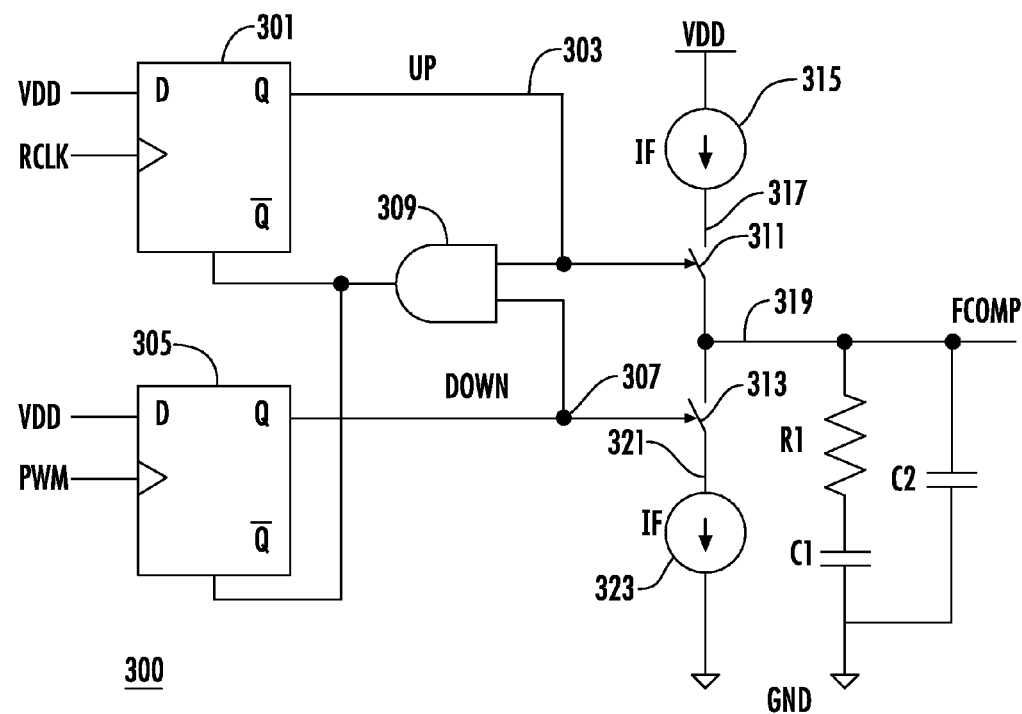
FIG. 3 is a schematic and block diagram of a phase comparator according to one embodiment which may be used to develop the frequency compensation signal FCOMP.

FIG. 3 is a schematic and block diagram of the phase comparator 300 according to one embodiment which may be used to develop the FCOMP signal. RCLK is applied to the clock input of a D-type flip-flop (DFF) 301, which has its D input pulled high to VDD. The Q output of DFF 301 provides a signal UP which is provided to a node 303. The PWM signal is provided to the clock input of another DFF 305, which has its D input pulled high to VDD. The Q output of DFF 305 provides a signal DOWN to a node 307. A 2-input AND gate 309 has its respective inputs coupled to nodes 303 and 307 for logically combining the UP and DOWN signals. The output of the AND gate 309 is coupled to the clear inputs of both DFFs 301 and 305. Node 303 is coupled to provide the UP signal to a control input of a SPST switch 311. Node 307 is coupled to provide the DOWN signal to a control input of another SPST switch 313. A current source 315 is coupled to source current from VDD to node 317, and the switched terminals of the switch 311 are coupled between node 317 and a node 319. The switched terminals of the switch 313 are coupled between node 319 and a node 321, and another current source 323 is coupled to sink current from node 321 to ground. The current source 315 sources a current IF from VDD to node 317 and the current source 323 sinks the current IF from node 321 to ground. Each of the switches 311 and 313 is opened when the corresponding control signal UP and DOWN, respectively, is low, and is closed when the corresponding control signal UP and DOWN, respectively, is high. A resistor-capacitor (RC) network includes a resistor R1 and a capacitor C1 coupled in series between node 319 and ground, and another capacitor C2 coupled between node 319 and ground. The node 319 develops the FCOMP signal.

The RC network including the resistor R1 and the capacitors C1 and C2 collectively form a frequency compensation network to filter FCOMP. The PWM signal, which establishes the actual switching frequency of the regulator 107, is compared by the DFFs 301 and 305 to the RCLK signal, which is set to a desired switching frequency of the regulator 107. If the rising edge of RCLK comes earlier than the next rising edge of PWM, which indicates that regulator switching frequency is slower than the target frequency established by RCLK, then the UP signal is latched high and switch 311 is closed while switch 313 remains opened. The current source 315 sources the IF current to charge the frequency compensation network (R1, C1, C2) to increase the frequency compensation voltage FCOMP. Eventually, the PWM signal goes high causing the DOWN signal to be latched high to close the switch 313. When both switches 311 and 313 are closed, the current IF sourced by the current source 315 is redirected by the current source 323 away from the frequency compensation network. Further, the AND gate 309 goes high and clears both DFFs 301 and 305 so that the UP and DOWN signals are pulled back low. Thus, the time delay between the rising edges of RCLK and PWM determines how long the IF current is provided to the frequency compensation network to increase FCOMP.

If instead the rising edge of PWM occurs before the next rising edge of RCLK, which indicates that the regulator switching frequency is faster than the target frequency, then the DOWN signal is triggered high and the lower switch 313 is turned on while the upper switch 311 remains opened. In this case, the current source 323 sinks the IF current to discharge the frequency compensation network (R1, C1, C2) to decrease the frequency compensation voltage FCOMP. Eventually, the RCLK signal goes high causing the UP signal to be latched high to close the switch 311. When both switches 311 and 313 are closed, the current IF sourced by the current source 315 is provided to the current source 323, and the AND gate 309 goes high and clears both DFFs 301 and 305 so that the UP and DOWN signals are pulled back low. Thus, the time delay between the rising edges of PWM and RCLK determines how long the IF current is pulled from the frequency compensation network to reduce FCOMP.

The reference clock RCLK may be externally or internally provided. During steady state conditions, FCOMP remains steady and the switching frequency of the regulator 107 as determined by PWM is substantially equal to the frequency of RCLK regardless of circuit or value variations, including the voltage levels of VIN and VOUT and the ESR of the output capacitor 214. During transient conditions, the switching frequency of the regulator 107 changes appropriately to quickly respond to maintain the desired level of regulation. After the transient condition, the switching frequency is once again controlled to be substantially equal to the frequency of RCLK.

Figure 9:
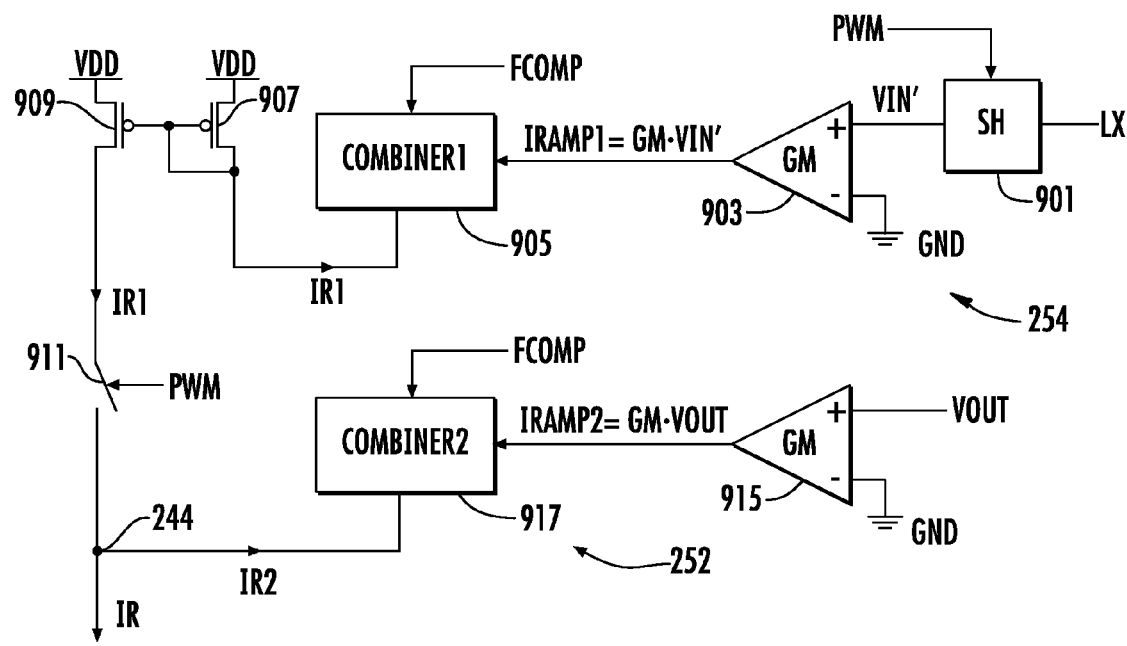
FIG. 9 is a simplified schematic and block diagram of a more detailed configuration of the transconductance network and the combiner network of FIG. 2.

FIG. 9 is a simplified schematic and block diagram of a more detailed configuration of the transconductance network 254 and the combiner network 252. The transconductance network 254 includes two transconductance amplifiers 903 and 915 and a sample and hold (SH) network 901. The transconductance amplifiers 903 and 915 each have a transconductance GM. The phase signal LX is provided to the an input of the SH network 901, which samples LX when PWM is high and provides a sampled and held output VIN'. As previously described, when PWM is high, LX goes high to about VIN (after switching stabilizes), so that VIN' generally has about the same voltage level as VIN. Although VIN may be used directly in other embodiments, the SH network 901 provides a method of indirectly sampling VIN. VIN' is provided to the non-inverting (+) input of the transconductance amplifier 903, which has its inverting input coupled to GND. In this manner, the transconductance amplifier 903 develops a current at its output of IRAMP1=GM·VIN' or a current proportional to VIN.

VOUT is provided to the non-inverting (+) input of the transconductance amplifier 915, which has its inverting input coupled to GND. In this manner, the transconductance amplifier 915 develops a current at its output of IRAMP2=GM·VOUT or a current proportional to VOUT.

The combiner network 252 includes two combiners 905 (COMBINER1) and 917 (COMBINER2), a pair of P-type MOS transistors 907 and 909 and a switch 911. IRAMP1 is provided to an input of the first combiner 905, which receives FCOMP at another input and which develops a first adjusted ramp current IR1 at its output. The P-type MOS transistors 907 and 909 are coupled as a current mirror to mirror the current IR1 to the ripple node 244 through the switch 911. The sources of transistors 907 and 909 are coupled to VDD, and their gates and the drain of transistor 907 are coupled together at the output of the combiner 905 drawing the output current IR1. IRAMP2 is provided to an input of the second combiner 917, which receives FCOMP at another input and which develops a second adjusted ramp current IR2 at its output. IR2 is provided directly to draw current from node 244. PWM is provided to the control input of the switch 911, which is opened when PWM is low and closed when PWM is high.

In operation, the transconductance amplifier 903 develops the ramp current IRAMP1 proportional to VIN, which is adjusted by FCOMP via the combiner 905 and provided as the adjusted ramp current IR1. IR1 is mirrored to source current proportional to VIN to the ripple node 244 when PWM is high. The transconductance amplifier 915 develops the ramp current IRAMP2 proportional to VOUT, which is adjusted by FCOMP via the combiner 917 and provided as the adjusted ramp current IR2. In this manner, the ripple capacitor 246 is continuously discharged by IR2 and charged by IR1-IR2 when PWM is high.

Figure 4:
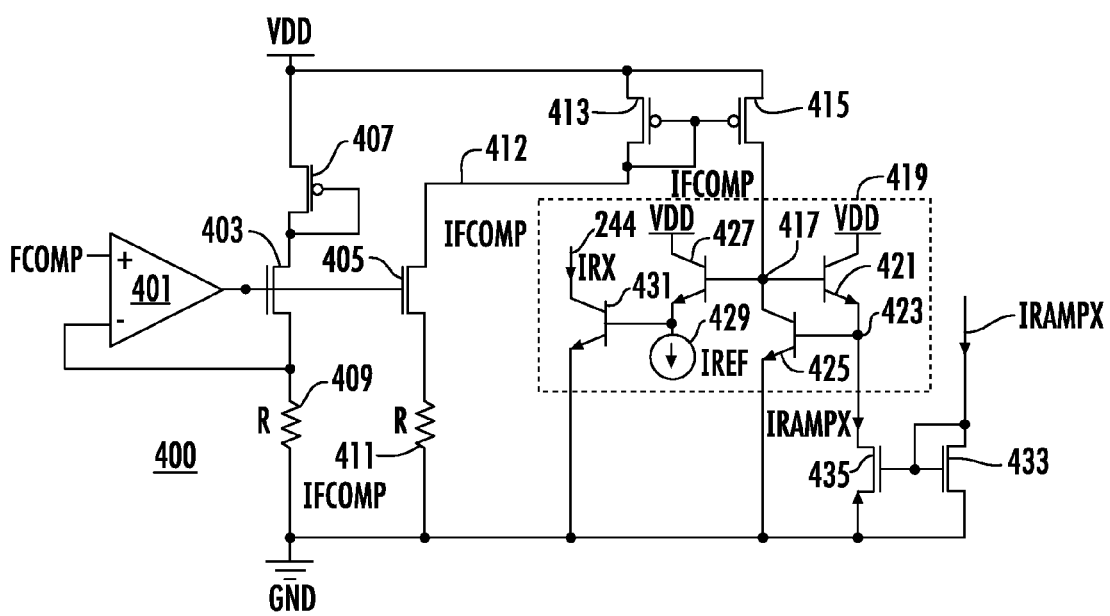
FIG. 4 is a schematic diagram of an exemplary embodiment of a combiner according to an exemplary embodiment which may be used to implement either or both of the combiners of FIG. 9.

FIG. 4 is a schematic diagram of an exemplary embodiment of a combiner 400 according to an exemplary embodiment which may be used to implement either or both of the combiners 905 and 917. FCOMP is provided to the non-inverting input of an operational amplifier 401, having its output coupled to the gates of two N-type MOS transistors 403 and 405. The source of transistor 403 is coupled to the inverting input of amplifier 401 and to one end of a resistor 409 having a resistance R. The source of transistor 403 is coupled to one end of another resistor 411 also having a resistance R. The other ends of the resistors 409 and 411 are coupled to ground. A P-type MOS transistor 407 is diode-coupled having it source coupled to the source voltage VDD and its gate and drain coupled to the drain of transistor 403. The drain of transistor 405 is coupled to a node 412.

The amplifier 401, the transistors 403, 405 and 407, and the resistors 409 and 411 collectively form a buffer or voltage to current converter circuit for converting the FCOMP voltage to the corresponding current IFCOMP. The amplifier 401 operates to control the transistor 403 to maintain the voltage at its inverting input at the source of transistor 403 at the same voltage level as FCOMP. In this manner, a current IFCOMP=FCOMP/R develops through the resistor 409. The transistor 405 may be substantially matched with the transistor 403, so that the current IFCOMP flows from node 412 through transistor 405 and the resistor 411. The resistance R of the resistors 409 and 411 are configured or otherwise chosen to determine a gain between the voltage FCOMP and the current IFCOMP. Although the buffer converter circuit is shown as part of the combiner 400, such is only a matter of design preference. The buffer converter circuit may alternatively be separately provided or included as part of the output of the phase comparator 300 to provide the IFCOMP current directly to the combiner 400.

A pair of P-type MOS transistors 413 and 415 are coupled as a current mirror to mirror the current IFCOMP through node 412 to a node 417 at an input of a current combiner network 419. The sources of transistors 413 and 415 are coupled to VDD, and their gates and the drain of transistor 413 are coupled together at node 412. In one embodiment, the current combiner network 419 may be implemented as a Gilbert cell or the like. The current combiner network 419 includes bipolar junction transistors (BJTs) 421, 423, 425, 427 and 431 and a current source 429 developing a reference current IREF. The collectors of transistors 421 and 427 are coupled to VDD and their bases are coupled together at node 417 receiving IFCOMP. The emitter of transistor 421 is coupled to another input node 423 which is further coupled to the base of transistor 425. The collector of transistor 425 is coupled to node 417 and its base is coupled to ground. The emitter of transistor 427 is coupled to an input of the current source 429 and to the base of transistor 431. The output of the current source 429 is coupled to ground. The emitter of transistor 431 is coupled to ground, and its collector is coupled to the ripple node 244 and develops an adjusted ramp current IRX. IRX represents either one of IR1 or IR2. IREF is a constant current level which is configured to select gain of the current combiner network 419.

A pair of N-type MOS transistors 433 and 436 are coupled as a current mirror to mirror an input current IRAMPX to node 423 at an input of the current combiner network 419. IRAMPX represents either one of IRAMP1 or IRAMP2. The sources of transistors 433 and 435 are coupled to ground, and their gates and the drain of transistor 433 are coupled together at the input node receiving IRAMPX.

The current combiner network 419 is operative to multiply the current IFCOMP by the current IRAMPX divided by the reference current IREF to develop IRX, or IRX=IFCOMP·IRAMPX/IREF. Since IFCOMP=FCOMP/R, the output ramp current IRX is according to the following equation (1):

$$IRX = \frac{FCOMP \cdot IRAMPX}{R \cdot IREF} \quad (1)$$

in which R and IREF are selected to determine the gain of the combiner 400. The current IR (combination of IR1 and IR2) goes positive and negative based on the voltage difference between LX and VOUT with successive cycles of PWM to charge/discharge the ripple capacitor 246 and thus to develop the auxiliary ripple voltage VR. The phase comparator 300 compares the phases of RCLK and PWM to develop FCOMP, which is multiplied by both IRAMP1 and IRAMP2 to adjust the steady-state operating frequency of the regulator 107.

Figure 5:
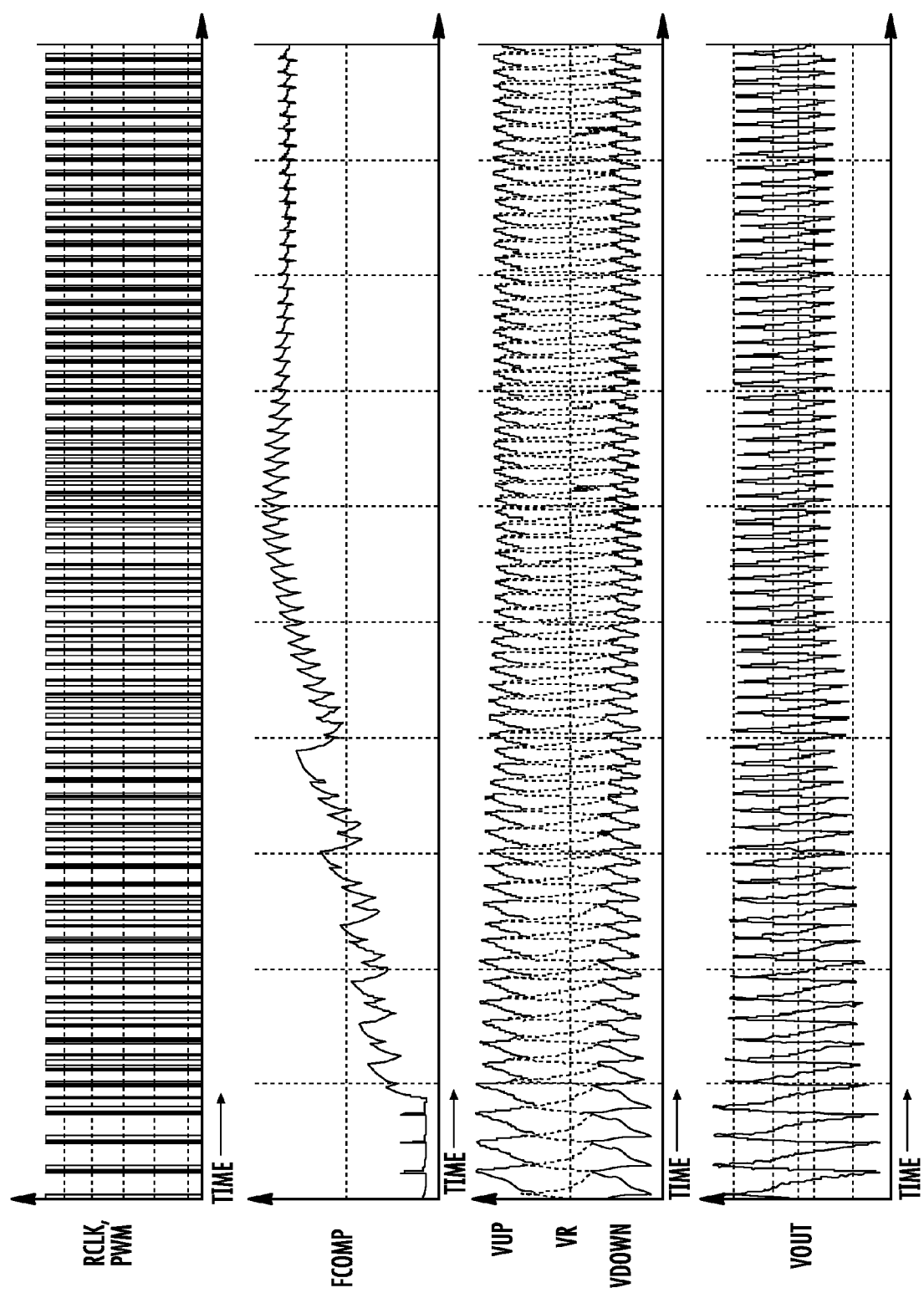
FIG. 5 is a series of timing diagrams plotting RCLK, PWM, FCOMP, VUP, VR, VDOWN and VOUT versus time according to one embodiment.

FIG. 5 is a series of timing diagrams plotting RCLK, PWM, FCOMP, VUP, VR, VDOWN and VOUT versus time according to one embodiment. RCLK and PWM are plotted together on the top timing diagram, FCOMP is plotted on the second timing diagram, VUP, VR and VDOWN are plotted together on the third timing diagram, and VOUT is plotted on the last diagram. The timing diagrams collectively illustrate how the regulator 107 responds to changes of the frequency of RCLK. RCLK begins at a lower frequency and then jumps to a higher frequency. After RCLK increases, the frequency of PWM lags while FCOMP increases with successive cycles of PWM in response to the increased frequency of RCLK. The slope of VR increases as FCOMP increases, which increases the frequency of PWM. VUP and VDOWN both toggle up and down with VR, while the difference between VUP and VDOWN remains constant since the window network maintains the overall hysteretic window voltage constant. FCOMP eventually settles in at a higher voltage level as the frequency of the PWM becomes substantially equal with the frequency of RCLK.

Figure 6:
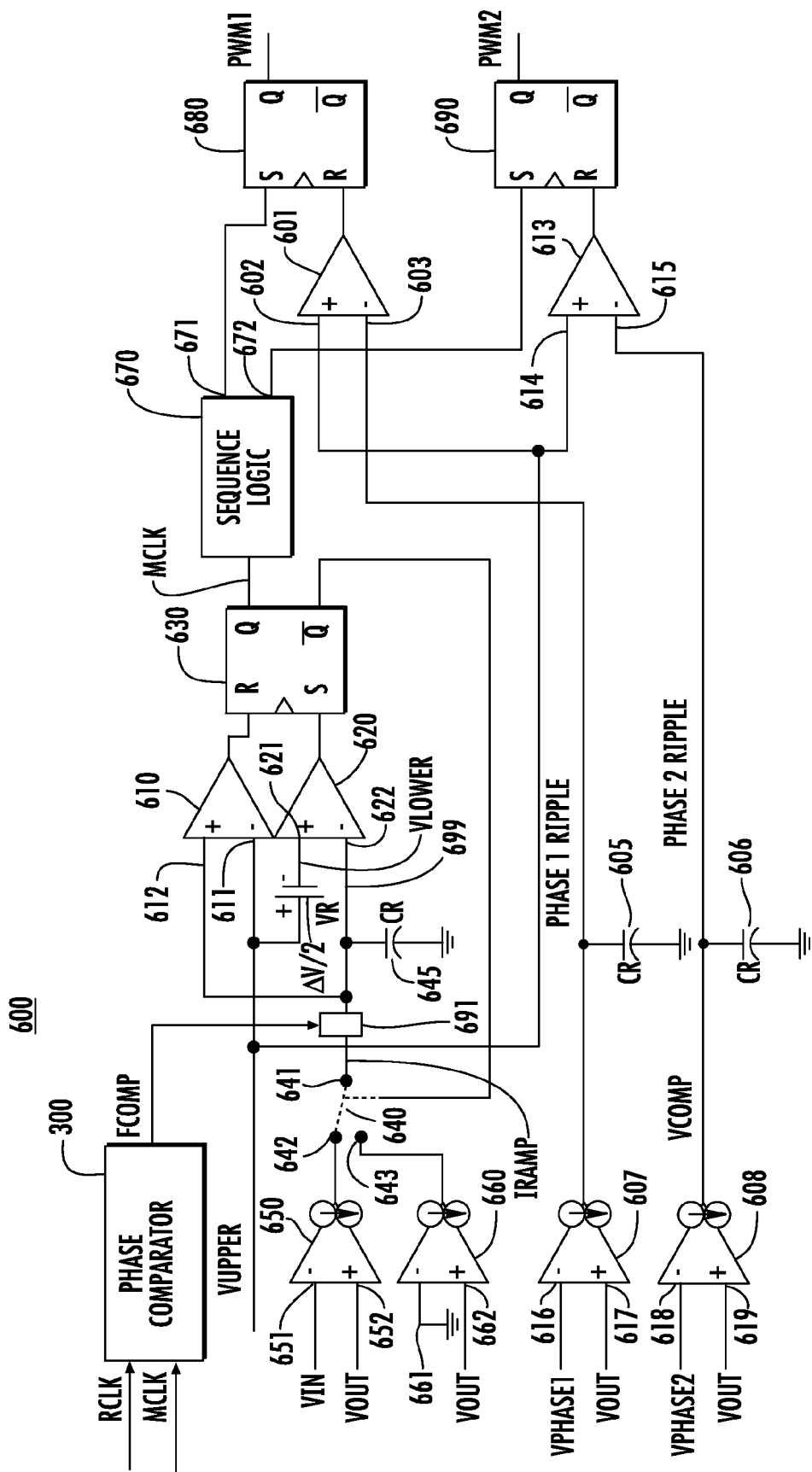
FIG. 6 is a schematic and clock diagram of a controller which may be used to control a multiphase synthetic ripple voltage regulator implemented in accordance the present invention with frequency control.

FIG. 6 is a schematic and clock diagram of a controller 600 which may be used to control a multiphase synthetic ripple voltage regulator 800 (FIG. 8) implemented in accordance the present invention with frequency control. Although only two phases are illustrated, it will be readily appreciated from the following description that the architecture and functionality of the present invention may be readily expanded to additional phases as desired. A two phase implementation has been shown as a reduced complexity multiphase example for purposes of reducing the complexity of the drawings and their attendant description.

The controller 600 includes a master hysteretic comparator formed of upper and lower threshold comparators 610 and 620, outputs of which are respectively coupled to the RESET and SET inputs of a SET/RESET flip-flop 630. The Q output of the flip-flop 630 provides a master clock signal MCLK, which toggles at the actual operating frequency of the controller 600. A first, inverting (−) input 111 of comparator 610 is coupled to receive an upper threshold voltage VUPPER, while a first, non-inverting (+) input 621 of comparator 620 is coupled to receive a lower threshold voltage VLOWER, that is some prescribed offset ΔV/2 lower than the upper threshold voltage VUPPER. Although not shown, an error amplifier, similar to the error amplifier 220 of the regulator 107, develops a compensation or error signal or the like which adjusts VUPPER and VLOWER in a similar manner as VUP and VDOWN, where the voltage window difference between VUPPER and VLOWER remains fixed at ΔV/2. Each of the second, non-inverting input 612 of comparator 610 and a second, inverting (−) input 622 of comparator 620 are coupled to a node 699, which is coupled to an output of a combiner network 691 and also to a ripple capacitor 645, which is referenced to ground. The combiner network 691 is configured in similar manner as the combiner network 252 with a single input for receiving a bidirectional IRAMP current. Node 699 develops a ripple voltage VR. The input of the combiner network 691 is coupled to a common terminal 641 of a controlled switch 640, which is controlled by the inverting Q, or $\overline{Q}$, output of the flip-flop 630. The phase comparator 300 is included, which receives the external reference clock signal RCLK and the master clock signal MCLK, and which provides the frequency compensation voltage FCOMP to an input of the combiner network 691.

A first input terminal 642 of switch 640 is coupled to the output of a transconductance amplifier 650, while a second input terminal 643 of switch 640 is coupled to the output of a transconductance amplifier 660. Transconductance amplifier 650 has a first, non-inverting (+) input 651 coupled to receive the input voltage VIN to the controller 600, while a second, inverting (−) input 652 thereof is coupled to receive the output voltage VOUT of the controller 600. Transconductance amplifier 650 produces an output current proportional to the difference between its inputs, namely proportional to VIN−VOUT. Transconductance amplifier 660 has a first, non-inverting (+) input 661 coupled to ground, while a second input 662 thereof is coupled to receive the output voltage VOUT. Transconductance amplifier 650 produces an output current proportional to the difference between its inputs, namely proportional to 0 (Voltage of ground)−VOUT.

The Q output of flip-flop 630, which develops the MCLK signal, is coupled to an input of a sequence logic circuit 670. Sequence logic circuit 670, which may be implemented as a counter, has N outputs corresponding to the number of phases being generated. In the present two phase example, sequence logic circuit 670 has a first output 671 coupled to the SET input of a SET/RESET flip-flop 680 and a second output 672 coupled to the SET input of a SET/RESET flip-flop 690. For this purpose, sequence logic 670 may be implemented as a flip-flop for a two-phase application, or a shift register in more than a two-phase application. The RESET input of flip-flop 680 is coupled to the output of a comparator 601, while the RESET input of flip-flop 690 is coupled to the output of a comparator 613.

Comparators 601 and 613 have inverting (−) inputs 602 and 614, respectively, coupled to receive the upper threshold voltage VUPPER. The non-inverting (+) input 603 of comparator 601 is coupled to receive a PHASE 1 RIPPLE voltage waveform that is developed across a capacitor 605, as a result of current supplied to capacitor 605 by a PHASE 1 transconductance amplifier 607. The non-inverting (+) input 615 of comparator 613 is coupled to receive a PHASE 2 RIPPLE voltage that is developed across a capacitor 606, as a result of current supplied to capacitor 606 by a phase 2 transconductance amplifier 608.

PHASE 1 transconductance amplifier 607 has a first, non-inverting (+) input 616 coupled to receive a PHASE 1 voltage VPHASE1 and a second, inverting (−) input 617 coupled to receive the output voltage VOUT. The PHASE 1 voltage VPHASE1 corresponds to the phase voltage LX at node 206 of the single phase regulator 107 except associated with a first phase output voltage, and controllably gated in accordance with a first phase PWM1 waveform provided at the Q output of output flip-flop 680. Thus, transconductance amplifier 607 generates the PHASE 1 RIPPLE voltage proportional to VPHASE1−VOUT. Similarly, PHASE 2 transconductance amplifier 608 has a first, non-inverting (+) input 618 coupled to receive a PHASE 2 voltage VPHASE2, and a second, inverting (−) input 619 coupled to receive the output voltage VOUT. The PHASE 2 voltage VPHASE2 corresponds to the phase voltage LX at node 206 of the single phase regulator 107 except associated with a second phase output voltage, and controllably gated in accordance with a second phase PWM2 waveform provided at the Q output of output flip-flop 690. Thus, transconductance amplifier 608 generates the PHASE 2 RIPPLE voltage proportional to VPHASE2−VOUT.

In a conventional multiphase synthetic ripple voltage regulator, node 641 was directly coupled to 699 without the combiner 640. The controller 600 interposes the combiner network 691, which operates in substantially similar manner as previously described. The transconductance amplifiers 650 and 660 and the switch 640 collectively operate in substantially similar manner as the transconductance network 254. When MCLK is high, switch 640 selects node 642 at the output of the transconductance amplifier 650 sourcing a current proportional to VIN−VOUT, similar to LX−VOUT when LX is pulled to VIN. When MCLK is low, switch 640 selects node 643 at the output of the transconductance amplifier 660 sinking a current proportional to 0−VOUT, similar to LX−VOUT when LX is pulled low to ground. Thus, a current IRAMP is provided at the input of the combiner network 691 via node 641. The phase comparator 300 operates in substantially similar manner except that it compares the master clock MCLK with RCLK rather than PWM, and provides FCOMP in substantially similar manner. As further described herein, MCLK controls operation of each of the multiple PWM signals PWM1 and PWM2 of the controller 600. The combiner network 691 combines IRAMP and FCOMP (with IREF) as previously described, and generates the adjusted ramp current IR at its output provided to charge and discharge the ripple capacitor 645 to develop the ripple voltage VR.

Figure 7:
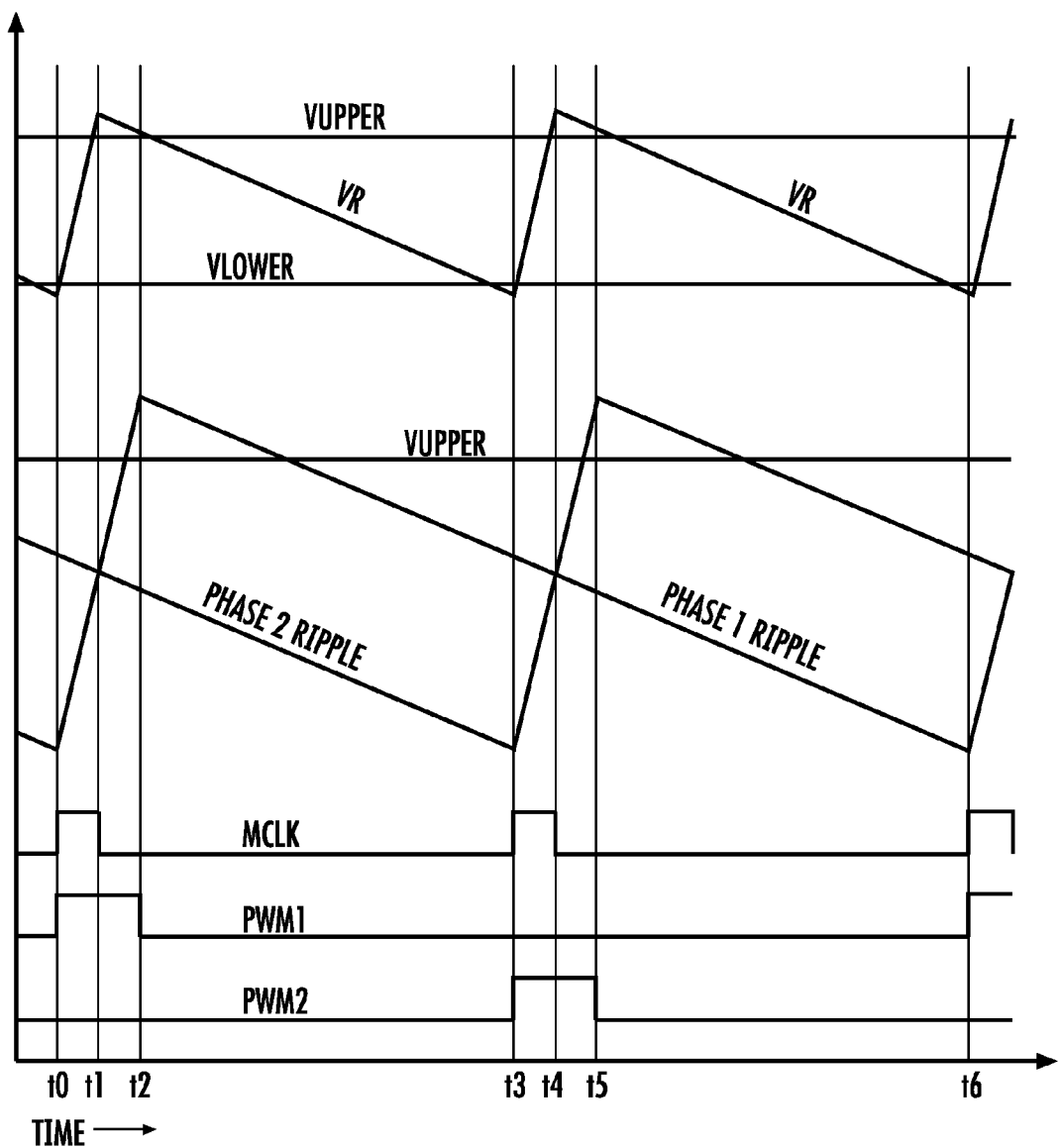
FIG. 7 is a simplified timing diagram illustrating operation of the controller of FIG. 6 with frequency control during steady state operation.

FIG. 7 is a simplified timing diagram illustrating operation of the controller 600 with frequency control during steady state operation. The ripple voltage VR is plotted superimposed with VUPPER and VLOWER, PHASE 1 RIPPLE and PHASE 2 RIPPLE are plotted superimposed with VUPPER, and the MCLK, PWM1 and PWM2 signals are plotted versus time. VUPPER and VLOWER are shown at fixed levels, where it is understood that they both vary with the compensation or error voltage as previously described. Operation at steady-state is substantially similar to the conventional configuration in which operation of the phase comparator 300 and the combiner network 691 is temporarily ignored. At a time t0, VR falls below VLOWER as detected by the comparator 620, which sets the flip-flop 630 pulling MCLK high. When MCLK goes high, the switch 640 selects the output of the transconductance amplifier 650 to inject a positive current to charge the capacitor 645 so that VR starts ramping up. Also, the sequence logic 670 sets the flip-flop 680 to pull PWM1 high, which couples the corresponding phase node (not shown) to VIN pulling VPHASE1 high. The transconductance amplifier 607 injects a positive current to charge the capacitor 605 so that PHASE 1 RIPPLE starts ramping up.

At subsequent time t1, VR reaches or otherwise exceeds VUPPER as detected by the comparator 610, which resets the flip-flop 630 to pull MCLK back low. The switch 640 switches to select the output of the transconductance amplifier 660, which sinks current from the ripple capacitor 645 so that VR ramps back down. PHASE 1 RIPPLE is still ramping up since it has not yet reached VUPPER. At subsequent time t2, PHASE 1 RIPPLE reaches or otherwise exceeds VUPPER, so that the comparator 601 resets the flip-flop 680 to pull PWM1 back low. VR, PHASE 1 RIPPLE and PHASE 2 RIPPLE ramp down after time t2 until the next cycle.

At subsequent time t3, VR again falls below VLOWER as detected by the comparator 620, which sets the flip-flop 630 pulling MCLK high once again. When MCLK goes high, the switch 640 selects the output of the transconductance amplifier 650 to inject a positive current to charge the capacitor 645 so that VR starts ramping up. In this case, the sequence logic 670 sets the flip-flop 690 to pull PWM2 high, which couples the corresponding phase node (not shown) to VIN pulling VPHASE2 high. The transconductance amplifier 608 injects a positive current to charge the capacitor 606 so that PHASE 2 RIPPLE reverses and starts ramping up. It is noted that PHASE 1 RIPPLE continues to ramp down since the sequence logic 670 now selects PHASE 2 rather than phase 1.

At subsequent time t4, VR again reaches or otherwise exceeds VUPPER as detected by the comparator 610, which resets the flip-flop 630 to pull MCLK back low. The switch 640 switches to select the output of the transconductance amplifier 660, which sinks current from the ripple capacitor 645 so that VR again ramps back down. PHASE 2 RIPPLE is still ramping up since it has not yet reached VUPPER. At subsequent time t5, PHASE 2 RIPPLE reaches or otherwise exceeds VUPPER, so that the comparator 613 resets the flip-flop 690 to pull PWM2 back low. VR, PHASE 1 RIPPLE and PHASE 2 RIPPLE once again ramp down after time t5 until the next cycle. The next cycle begins at subsequent time t6, in which case MCLK and PWM1 go high once again.

Operation repeats in this manner in which the sequence logic 670 selects the multiple phases one at a time in round-robin fashion. the VUPPER and VLOWER voltages operate in similar manner as the window voltages VUP and VDOWN, and although not specifically shown, these voltages vary up and down in response to changes of an error or compensation signal in similar manner. In this manner, in response to output transients, the frequency of MCLK, and thus the frequency of both PWM1 and PWM2, change accordingly to counteract the transient and maintain regulation. Furthermore, the frequency of MCLK, PWM1 and PWM2 would otherwise in response to changes of VIN, VOUT, steady-state load current, and the ESR of the output capacitor, among other factors.

The phase comparator 300 and the combiner network 691 operate to maintain the steady-state frequency of MCLK to be substantially equal to the frequency of RCLK in a similar manner previously described. When the frequency of MCLK is different from RCLK for any reason, such as changes in VIN, VOUT, steady-state load, or ESR of the output capacitor, the phase comparator 300 adjusts FCOMP and the combiner network 691 adjusts its output so that MCLK settles back to the frequency of RCLK. The frequencies of PWM1 and PWM2, which are lower than (e.g., half) the frequency of MCLK, also adjust accordingly to settle in at predetermined target frequencies during steady-state conditions as dictated by RCLK.

Figure 8:
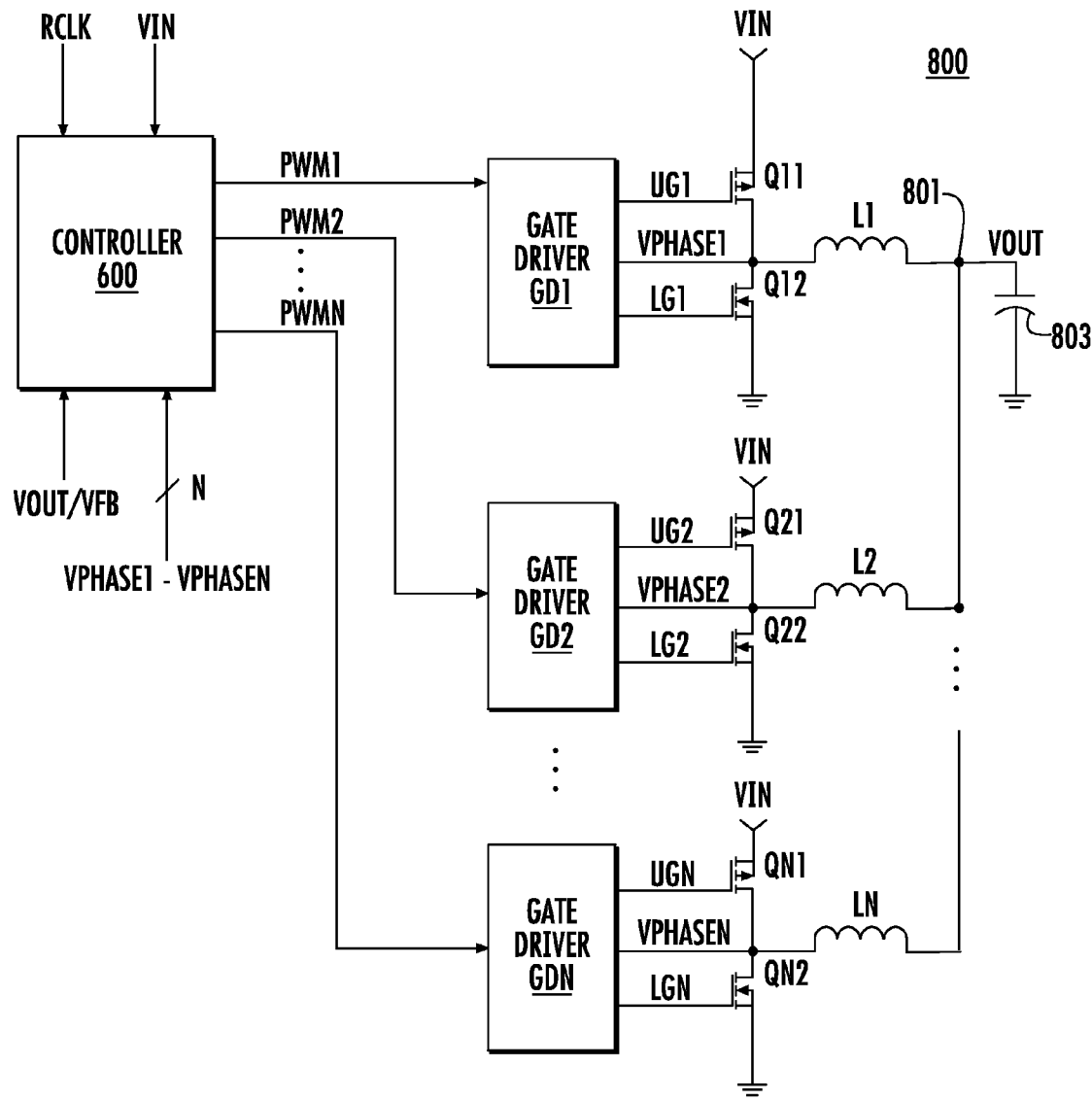
FIG. 8 is a simplified schematic and block diagram of the multiphase synthetic ripple voltage regulator implemented using the controller of FIG. 6 according to an exemplary embodiment having "N" phases.

FIG. 8 is a simplified schematic and block diagram of the multiphase synthetic ripple voltage regulator 800 implemented using the controller 600 according to an exemplary embodiment having "N" phases. The multiphase regulator 800 may be used as the regulator 107 shown in FIG. 1 The controller 600 receives RCLK, VIN and VOUT (or VFB) and N phase voltages VPHASE1-VPHASEN and provides N PWM signals PWM1, PWM2, . . . , PWMN to respective N gate drivers GD1, GD2, . . . , GDN forming N channels for the multiphase regulator 800. The number N is any positive integer greater than one, including N=2 for the two-phase case. For the first channel, the PWM1 signal is provided to the first gate driver GD1, which controls the turn-on and turn-off of a pair of electronic power switching devices or switches Q11 and Q12. In particular, the gate driver GD1 generates an upper gate switching signal UG1 provided to the control terminal (e.g., gate) of the upper (or high side) switch Q11 and generates a lower gate switching signal LG1 provided to the control terminal of the lower (or low side) switch Q12. In the particular configuration shown, the switches Q11 and Q12 are depicted as N-channel metal-oxide semiconductor field-effect transistors (MOSFETs) having their drain-source current paths coupled in series between a pair of input power supply terminals. In the configuration shown, the input power supply terminals develop an input voltage VIN1 referenced to ground (GND). Other types of electronic switching devices are contemplated. The drain of switch Q12 is coupled to the source of switch Q11 at a phase node VPHASE1 developing the voltage VPHASE1, which is coupled to one end of an output inductor L1. The other end of the inductor L1 is coupled to a common output node 801 developing an output signal VOUT.

The remaining channels 2-N of the multiphase regulator 800 are configured in substantially the same manner as the first channel. The PWM2 (or PWMN) signal is provided to the gate driver GD2 (or GDN), which provides signals UG2 and LG2 (or UGN and LGN) to drive switches Q21 and Q22 (or QN1 and QN2) coupled together at phase node VPHASE2 (or VPHASEN) between the input voltage VIN referenced to ground. The phase node VPHASE2 (or VPHASEN) is coupled through output inductor L2 (or LN) to the output node 801 developing VOUT. The output node 801 is coupled to an output capacitor 803 referenced to ground. A load may be coupled to the output node 801 and ground to receive VOUT, such as, for example, the device circuitry 111 of the electronic device 100. The VIN and VOUT signals are fed back to the controller 600. The multiple phases or channels of the multiphase regulator 800 are coupled in parallel to regulate VOUT. For the multiphase regulator 800, each channel includes a separate phase node and output inductor. Each of the phase nodes VPHASE1-VPHASEN (developing phase voltages VPHASE1-VPHASEN of each channel exhibits large and fast transitions, effectively switching between VIN and ground or 0V, whereas the output node 801 developing the VOUT signal remains relatively stable. Thus, each inductor L1-develops a relatively large, triangular-shaped ripple current signal during operation. The corresponding ripple voltages PHASE 1 RIPPLE, PHASE 2 RIPPLE, etc. are developed based on the output inductor ripple currents for controlling switching of each phase as previously described.

A synthetic ripple regulator with frequency control as described herein introduces a novel architecture synchronizing operating frequency with an external clock, so that the regulator is fit for general purpose applications. A phase lock loop control is introduced to the main regulator control loop so as to lock the switching frequency to an applied clock signal. A feedback loop is used to adjust the slope of the synthetic current ripple in response to the difference of the clock and switching frequencies. The phase comparator may be implemented in any alternative fashion as understood by those of ordinary skill in the art. As the hysteretic window size is fixed, the present architecture described herein may be applied to applications in which the input voltage changes dramatically.

A synthetic ripple regulator is disclosed herein which converts an input voltage to a regulated output voltage and which includes frequency control based on a reference clock. The regulator includes an error network, a ripple detector, a combiner, a ripple generator, a comparator network and a phase comparator. The error network provides an error signal indicative of relative error of the output voltage. The ripple detector provides a ramp control signal based on the input and output voltages and a pulse control signal. The combiner adjusts the ramp control signal based on a frequency compensation signal to provide an adjusted ramp control signal. The ripple generator develops a ripple control signal based on the adjusted ramp control signal. The comparator network develops the pulse control signal to control switching based on the error signal and the ripple control signal. The phase comparator compares the pulse control signal with the reference clock and provides the frequency compensation signal indicative thereof.

In one embodiment, the phase comparator compares the reference clock and the actual operating frequency as indicated by the pulse control signal, and is used to adjust the ramp control signal. The frequency of the pulse control signal may vary with circuit conditions or variables, such as input voltage, output voltage, output capacitance, etc. In a synthetic ripple regulator, the frequency of the pulse control signal may vary to allow fast response to output load transients. The frequency compensation provided by the phase comparator compensates for operating frequency variations so that the steady-state operating frequency is based on the reference clock and thus remains stable.

The synthetic ripple regulator may be implemented as a multiphase regulator. The synthetic ripple regulator may be implemented on an electronic device. The electronic device, for example, may include a processor and memory common for many types of computer devices.

A method of controlling steady-state switching frequency of a synthetic ripple regulator based on a reference clock according to one embodiment includes determining an error of the output voltage and providing a compensation signal indicative thereof, developing a window signal with upper and lower limits using the compensation signal generating a ramp signal based on a difference between the input and output voltages when a pulse control signal is asserted high and based on the output voltage when the pulse control signal is asserted low, providing a frequency compensation value based on comparing the pulse control signal and the reference clock, adjusting the ramp signal based on the frequency compensation value and providing an adjusted ramp signal, converting the adjusted ramp signal to a ripple signal, and comparing the ripple signal and the window signal and providing the pulse control signal indicative thereof.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing the same purposes of the present invention without departing from the spirit and scope of the invention as defined by the following claims.

The invention claimed is:

1. A synthetic ripple regulator which converts an input voltage to a regulated output voltage and which includes frequency control based on a fixed frequency reference clock, said synthetic ripple regulator comprising:
an error network providing an error signal indicative of relative error of the output voltage;
a ripple detector which provides a ramp control signal based on the input and output voltages and a pulse control signal;
a combiner which adjusts said ramp control signal based on a frequency compensation signal to provide an adjusted ramp control signal;
a ripple generator which develops a ripple control signal based on said adjusted ramp control signal;
a comparator network which develops said pulse control signal to control switching based on said error signal and said ripple control signal at a frequency that varies in response to load transients; and
a phase comparator which compares said pulse control signal with the reference clock and which provides said frequency compensation signal indicative thereof to control steady-state operating frequency of the synthetic ripple regulator by adjusting said ramp control signal to adjust said frequency of said pulse control signal towards the fixed frequency of the reference clock.

2. The synthetic ripple regulator of claim 1, wherein:
said ripple detector comprises at least one transconductance device which provides a ramp control current based on the input and output voltages and a pulse control signal;
wherein said phase comparator compares said pulse control signal with the reference clock to develop said frequency compensation signal; and
wherein said combiner adjusts said ramp control current using said frequency compensation signal to provide an adjusted ramp control current.

3. The synthetic ripple regulator of claim 2, wherein said ripple generator comprises a ripple capacitance which is charged and discharged by said adjusted ramp control current.

4. The synthetic ripple regulator of claim 2, wherein frequency compensation signal comprises a frequency compensation current and wherein said combiner comprises a multiplier which multiplies said ramp control current by said frequency compensation current divided by a reference current.

5. The synthetic ripple regulator of claim 1, wherein said phase comparator comprises:
a first latch for detecting edges of the reference clock;
a second latch for detecting edges of said pulse control signal;
a resistor-capacitor network for developing a frequency compensation voltage; and
a switched current network controlled by said first and second latches for charging and discharging said resistor-capacitor network based on a duration between edges of the reference clock and said pulse control signal.

6. The synthetic ripple regulator of claim 1, wherein said comparator network comprises:
a window network which converts said error signal into a window signal with upper and lower limits; and
a hysteretic comparator which compares said ripple control signal with said window signal to develop said pulse control signal.

7. The synthetic ripple regulator of claim 1, further comprising:
a plurality of phase networks, each developing a corresponding one of a plurality of ripple control signals based on the input and output voltages and a corresponding one of a plurality of pulse width modulation signals; and
wherein said pulse control signal comprises a master clock signal which controls switching frequency of each of said plurality of pulse width modulation signals.

8. An electronic device, comprising:
a synthetic ripple regulator which converts an input voltage to a regulated output voltage and which includes frequency control based on a fixed frequency reference clock, wherein said synthetic ripple regulator comprises:
an error network providing an error signal indicative of relative error of the output voltage;
a ripple detector which provides a ramp control signal based on said input and output voltages and a pulse control signal;
a combiner which adjusts said ramp control signal based on a frequency compensation signal to provide an adjusted ramp control signal;
a ripple generator which develops a ripple control signal based on said adjusted ramp control signal;
a comparator network which develops said pulse control signal to control switching based on said error signal and said ripple control signal at a frequency that varies in response to load transients; and
a phase comparator which compares said pulse control signal with said reference clock and which provides said frequency compensation signal indicative thereof to control steady-state operating frequency of said synthetic ripple regulator by adjusting said ramp control signal to adjust said frequency of said pulse control signal towards said fixed frequency of said reference clock.

9. The electronic device of claim 8, wherein said synthetic ripple regulator comprises a multiphase regulator and wherein said pulse control signal comprises a master clock signal.

10. The electronic device of claim 8, further comprising:
a processor receiving said output voltage as source voltage; and
a memory, coupled to said processor, receiving said output voltage as source voltage.

11. The electronic device of claim 8, wherein said phase comparator comprises:
a first flip-flop which receives said reference clock and which provides an up signal;
a second flip-flop which receives said pulse control signal and which provides a down signal;
a control gate having inputs receiving said up and down signals and an output coupled to clear inputs of said first and second flip-flops;
a resistor-capacitor network developing a frequency compensation voltage as said frequency compensation signal;
a switched current source which charges said resistor-capacitor network when said up signal is asserted; and
a switched current sink which discharges said resistor-capacitor network when said down signal is asserted.

12. The electronic device of claim 8, wherein said combiner multiplies said ramp control signal by said frequency compensation signal to provide said adjusted ramp control signal.

13. The electronic device of claim 8, wherein:
said phase comparator provides said frequency compensation signal as a frequency compensation voltage;
wherein said ripple detector comprises a transconductance amplifier which provides said ramp control signal as a ramp control current based on voltage applied across an output inductance; and
wherein said combiner comprises and a multiplier which multiplies said frequency compensation voltage by said ramp control current.

14. The electronic device of claim 13, wherein said combiner includes a converter which converts said frequency compensation voltage to a frequency compensation current and wherein said multiplier comprises current multiplier which multiplies said frequency compensation current by said ramp control current divided by a reference current.

15. A method of controlling steady-state switching frequency of a synthetic ripple regulator based on a fixed frequency reference clock, wherein the synthetic ripple regulator converts an input voltage to a regulated output voltage, the method comprising:
determining an error of the output voltage and providing a compensation signal indicative thereof;
developing a window signal with upper and lower limits using the compensation signal;
generating a ramp signal based on a difference between the input and output voltages when a pulse control signal is asserted high and based on the output voltage when the pulse control signal is asserted low;
providing a frequency compensation value based on comparing the pulse control signal and the reference clock;
adjusting the ramp signal based on the frequency compensation value and providing an adjusted ramp signal to adjust a frequency of the pulse control signal towards the fixed frequency of the reference clock;
converting the adjusted ramp signal to a ripple signal; and
comparing the ripple signal and the window signal and providing the pulse control signal indicative thereof at a frequency that varies in response to load transients.

16. The method of claim 15, wherein said providing a frequency compensation value comprises:
increasing a level of the frequency compensation value when the reference clock has a higher frequency than the pulse control signal; and
decreasing the level of the frequency compensation value when the reference clock has a lower frequency than the pulse control signal.

17. The method of claim 15, wherein said adjusting the ramp signal based on the frequency compensation value comprises multiplying the ramp signal by the frequency compensation value.

18. The method of claim 15, wherein:
said generating a ramp signal comprises generating a ramp current;
wherein said generating a frequency compensation value comprises generating a frequency compensation current; and
wherein said adjusting the ramp signal comprises multiplying the ramp current by the frequency compensation current and dividing by a reference current.

19. The method of claim 15, wherein said converting the adjusted ramp signal comprises charging a ripple capacitor with an adjusted ramp current to provide a ripple voltage.

20. The method of claim 19, wherein:
said determining an error of the output voltage comprises amplifying a difference between the output voltage and a reference voltage to provide a compensation voltage;
wherein said developing a window signal comprises providing an upper voltage by adding an offset voltage to the compensation voltage and providing a lower voltage by subtracting an offset voltage from the compensation voltage; and
wherein said comparing the adjusted ripple signal and the window signal comprises comparing the ripple voltage with the upper voltage and the lower voltage.

* * * * *